United States Patent [19]

Isozaki et al.

[11] 3,933,939
[45] Jan. 20, 1976

[54] POLYESTER WITH EPOXY MONOMER, AND A CROSS-LINKING MONOMER

[75] Inventors: Osamu Isozaki; Seigo Iwase, both of Hiratsuka, Japan

[73] Assignee: Kansai Paint Company, Ltd., Japan

[22] Filed: June 10, 1974

[21] Appl. No.: 477,642

[30] Foreign Application Priority Data
June 13, 1973 Japan.............................. 48-65795

[52] U.S. Cl...... 260/872; 204/159.16; 260/31.2 XA; 260/32.8 R; 260/33.4 R; 260/75 UA; 260/75 A; 260/75 EP; 260/348 A
[51] Int. Cl.².......................................... C08L 67/06
[58] Field of Search........... 260/867, 869, 872, 871, 260/75, 75 VA, 75 EP, 75 A

[56] References Cited
UNITED STATES PATENTS 3,485,732  12/1969  D'Alelio.......................... 204/159.15
3,660,371   5/1972  Johnson et al...................... 260/672

*Primary Examiner*—Murray Tillman
*Assistant Examiner*—J. Ziegler
*Attorney, Agent, or Firm*—Ostrolenk, Faber, Gerb & Soffen

[57] ABSTRACT

A liquid unsaturated resin composition for coating material which comprises (A) 60 to 95 parts by weight of liquid resin and (B) 5 to 40 parts by weight of polyvinyl monomer, having high boiling point, in which said liquid resin is produced by adding a compound having both epoxy group and polymerizable unsaturated group to a linear polyester having terminal carboxyl groups and said linear polyester is produced by condensation of (a) aromatic dibasic acid or its acid anhydride and (b) aliphatic saturated compounds consisting of saturated aliphatic dibasic acid and saturated aliphatic glycol.

9 Claims, No Drawings

POLYESTER WITH EPOXY MONOMER, AND A CROSS-LINKING MONOMER

BACKGROUND OF THE INVENTION

1. Field of the Invention

This invention relates to a liquid unsaturated resin composition. More particularly, the invention relates to said resin composition which is used for coating material and forms an excellent coating film having superior water resistance, chemical resistance, solvent resistance and so forth. Furthermore, the present invention relates to said liquid unsaturated resin composition for coating material which contains little easily volatilizable component thus forming an excellent finished surface and causing no air pollution.

2. Description of Prior Art

In the conventional art, with respect to coating material, almost all sorts of resins such as polyesters, acrylic resins, epoxy resins and urethane resins are employed as the vehicles for electron beam-, ultraviolet ray- or catalyst-curable coating materials, the reactive unsaturated groups of which are introduced to the molecules of said resins through a variety of methods. They are, however, used by dilution with monovinyl monomer or several solvents. When the monovinyl monomer is used, the coating composition as formed is cured as it is, while in case solvents are used, the coating composition may be cured after setting or evaporation of the solvents by heat. Further, for convenience of the coating work, the coating compositions are usually diluted to 30 – 60% in resin content. In such circumstances, most of the monovinyl monomer evaporates during the coating step and curing step as it has a high vapor pressure, while in the use of solvent-type composition, the solvents should be forcibly evaporated. Nuisances to workers or others by bad odors and air pollution occur around the coating works, and, therefore the coating lines should be installed in a closed system. In addition, it is poor economy to exhaust the evaporated vinyl monomer, and it is impossible to completely eliminate the solvents from the waste gas.

In view of the above facts, the principal object of the present invention is to provide a novel and improved liquid resin composition for coating materials. A further object of the present invention is to provide a liquid unsaturated resin composition which forms an excellent coating film. A still further object of the present invention is to provide a liquid unsaturated resin composition which contains little easily volatilizable component to produce offensive odors and is cured by the application of electron beam or ultraviolet ray or catalytic reaction.

BRIEF SUMMARY OF THE INVENTION

In accordance with the present invention, said liquid unsaturated resin composition comprises 60 to 95% by weight of liquid resin and 5 to 40% by weight of polyvinyl monomer having a high boiling point, in which said liquid resin is produced by adding 1.5 to 2 molecules, as an average, of a monomer having both epoxy group and polymerizable unsaturated group to each molecule of a linear polyester of about 500 to about 5000, preferably 1,000 to 3,000, in number average molecular weight and having terminal carboxy groups, and the latter liner polyester is produced by condensation of a composition consisting essentially of (a) 10 to 25% by weight of aromatic dibasic acid or its anhydride and (b) 75 to 90% by weight of aliphatic saturated compounds consisting essentially of saturated aliphatic dibasic acid or its anhydride and saturated aliphatic glycol, wherein 10 to 60% by weight of said aliphatic saturated compounds is alicyclic saturated dibasic acid or its acid anhydride.

In the preparation of the resin composition of the present invention, 75 to 90% by weight of the aliphatic compounds and 10 to 25% by weight of the aromatic dibasic acid or its anhydridge are used and the molecular weight of the obtained liner polyester is restricted to a range of about 500 to about 5,000, thereby producing a liquid resin. The composition comprises almost 100% by weight of resin film forming ingredients. It may be cured by the irradiation of electron beam or ultraviolet ray, or catalystic reaction, which is the characteristic feature of the present invention.

DETAILED DESCRIPTION OF THE INVENTION

The aromatic dibasic acids or their acid anhydrides which may be used in the present invention include, for example, phthalic acid, phthalic anhydride, terephthalic acid and isophthalic acid, which may be used alone or in admixture with one another. Said saturated aliphatic dibasic acids include succinic acid, succinic anhydride, adipic acid and sebacic acid, which may be used alone or in admixture with one another, and said aliphatic glycols include ethylene glycol, pentyl glycol, isopentyl glycol, neopentyl glycol, 1,3-butylene glycol and 1,6-hexanediol which may be used alone or in admixture with one another. Further, said alicyclic saturated dibasic acids include hexahydrophthalic anhydride and esterified compounds of one molecule of cyclodecanediol with 2 molecules of succinic anhydride or hexahydrophthalic anhydride which may be used alone or in admixture with one another. As said compounds having both epoxy group and polymerizable unsaturated group, glycidyl acrylate, glycidyl methacrylate, and glycidyl allyl ether may be exemplified. They may be used alone or in admixture with one another.

The unsaturated resin as used in the present invention is prepared by the following method. In the first place, the monomer composition of raw materials for the polyester in the above-mentioned ratio is caused to react at 180° to 240°C under dehydration to carry out an esterification until the acid value becomes 10 to 1 higher than the theoretical final acid value. Then the temperature is lowered, and the addition reaction with the monomer having both epoxy group and polymerizable unsaturated group is then carried out at 100° to 140°C. Usually, the above esterification takes 3 to 8 hours and the addition reaction takes 1 to 5 hours. In the addition reaction, 100 to 1000 ppm of polymerization inhibitor such as hydroquinone or p-benzoquinone may be used. Further, about 0.1 to about 5% by weight, based on the total weight of the resin composition, of epoxy-ring opening catalyst may be added in order to accelerate said addition reaction. Examples of the catalyst are amines such as diethylamine, triethyl-amine, etc. Then, 60 to 95% by weight of thus obtained liquid unsaturated resin is mixed with 5 to 40% by weight of polyvinyl monomer having a high boiling point to prepare a vehicle for coating material.

As said polyvinyl monomers having a high boiling point, there are trimethylolpropane triacrylate, trimethylolethane trimethacrylate, ethylene glycol diacrylate, ethylene glycol dimethacrylate, 1,3-butylene glycol diacrylate, 1,3-butylene glycol dimethacrylate, 1,6-hexanediol diacrylate and 1,6-hexanediol dimethacrylate which may be used singly or at least two of which may be used in admixture.

In addition, 1 to 10% by weight, based on the total weight of the resin composition, of the saturated solvents conventionally used, for example, ketones, esters, alcohols or the like may be added to said resin composition if they cause no inconvenience. In the unsaturated resin composition of the present invention, when the amount of said aromatic dibasic acid is less than 10%, the resin is liable to become a paraffin-like solid, and even when the composition remains liquid, the water resistance and solvent resistance of the cured coating film are seriously lowered. If the amount of aromatic dibasic acid or its anhydride is more than 25%, the composition has too high a viscosity so that the coating operation of the composition becomes difficult.

The use of the aliphatic saturated compounds are indispensable in order to liquefy the resin composition, but 10 to 25% by weight of said aromatic dibasic acid or its anhydride are also necessary so as to break the configuration of $-CH_2-$ chain. Thus, the resin composition becoming waxy is avoided. The use of compounds having many ether linkages is most effective for the lowering of viscosity of the resin without the use of the conventional saturated solvents, however, when a raw material having ether linkages such as diethylene glycol is used, the water resistance of the obtained coating film is seriously reduced. Generally speaking, if the compounding ratio of aliphatic compounds is high, it becomes difficult to form a hard coating film. Accordingly, said alicyclic compounds in the amount of 10 to 60% by weight of said aliphatic compounds must be used so as to reduce the resin viscosity and simultaneously to increase the hardness of coating film. When the number average molecular weight of said linear polyester is less than about 500, the resin becomes crystalline and thus is liable to become solid, and in addition the properties, for example, gloss, flexibility, etc., of the obtained coating film are poor. On the other hand, when the molecular weight is more than about 5,000, the viscosity of the linear polyester becomes too high, and a long time is required for the cross linking reaction because cross linking points become few when it is allowed to react with the above-mentioned polyvinyl monomer. In case less than 1.5 molecules of the monomer having both epoxy group and polymerizable unsaturated group are added to one molecule of said linear polyester molecule, the cross linking is insufficient because cross linking points become few and thus the water resistance of the obtained film becomes poor.

Further, when less than 5 parts of said polyvinyl monomer is used, not only the cross linking is insufficient but also lowering of viscosity can be expected. When more than 40 parts of polyvinyl monomer is used, it may be good for the lowering of viscosity, however, the physical properties of the obtained film become inferior.

The polyvinyl monomer as used in the present invention lowers the resin viscosity, and at the same time, acts as a cross linking agent. However, it may be desirable that the amount of addition of the polyvinyl monomer be decreased as small as possible in view of the properties of obtained coating film. Taking the viscosity of the resin composition and film properties after curing into consideration, using the polyvinyl monomer in the range of 5 to 40% by weight to 60 to 95% by weight of the liquid unsaturated resin is desirable.

The unsaturated resin composition of the present invention can be applied on heating at a temperature of 40 to 100°C, if it is highly viscous. When the composition is cured by the irradiation of ultraviolet ray, 1 to 4% by weight, based on the total weight of the resin composition, of a photopolymerization initiator such as benzoin methyl ether, benzoin ethyl ether, benzoin propyl ether, etc. may be added, and in case of catalyst curing, 1 to 5% by weight, based on the total weight of the resin composition, of catalysts conventionally used such as the combination of benzoyl peroxide and cobalt salt may be added, and also in case of electron beam curing, the composition is cured without the addition of the above mentioned initiator and catalyst.

The coating film which is formed by using the composition of the present invention through the electron beam, ultraviolet ray-, or catalyst-curing is excellent in hardness, flexibility, water resistance, chemical resistance and solvent resistance, so that it may be used for coating materials on metal works, wood works, plastic articles and so forth. The surface state of the coating film is extremely fine which is considered to be the result of elimination of the use of solvents.

The following examples are included merely to aid in the understanding of the invention, and variations may be made by one skilled in the art without departing from the spirit and scope of the invention.

EXAMPLE 1

A polyester having terminal carboxyl group was prepared by condensing 90g of hexahydrophthalic anhydride, 202 g of adipic acid, 148g of phthalic anhydride, 104g of neopentyl glycol and 90g of 1,3-butylene glycol. The peak molecular weight in gel permeation chromatography (hereinafter referred to as "GPC") of said polyester was about 600. Then, 220g of glycidyl acrylate was added to said polyester and caused to react for 5 hours at 140°C. Further, 85g of thus obtained resin was mixed with 15g of 1,6-hexanediol diacrylate. Hereinafter this mixture is referred to as "Composition (1)".

One gram of benzoin methyl ether was added to 50g of said Composition (1), and this was applied to the surface of an iron plate to form a coating of 50 microns in thickness. Then this plate was irradiated by a 2 KW high pressure mercury lamp in nitrogen flow to cure the coated film. The cured film thus obtained is referred to as "Sample (1)-A".

In the meantime, 30g of titanium white was added to 50g of the Composition (1) and mixed well to prepare a coating material. This coating material was applied to the surface of an iron plate forming a film of 15 microns in thickness, and irradiated 10 MR of electron beam to obtain a cured coating which is referred to as "Sample (1)-B".

EXAMPLE 2

A polyester (GPC peak molecular weight: about 2,300) was prepared by condensing 123g of hexahydrophthalic anhydride, 17g of isophthalic acid and 94g of 1,6-hexanediol, and 28g of glycidyl methacrylate and 0.1g of triethylamine were mixed to the above product, and then this mixture was caused to react for 5 hours at 100°C. Further, 60g of the thus obtained liquid resin and 40g of 1,3-butylene glycol dimethacrylate were well mixed to form a Composition (2).

Said Composition (2) was applied to the surface of an iron plate to form a coating of 30 microns in thickness. This coating film was then cured by 10 MR of electron beam, and the cured film is referred to as "Sample (2)-A".

EXAMPLE 3

A polyester (GPC peak molecular weight: about 4,500) was prepared by condensing 149g of cyclodecanediol disuccinic ester, 30g of phthalic anhydride, 60g of sebacic acid, 25g of ethylene glycol and 47g of 1,6-hexanediol, then 30g of glycidyl methacrylate was added to the above condensation product and caused to react for 3 hours at 120°C. Then, 60g of the thus obtained liquid resin and 40g of trimethylolpropane triacrylate were mixed well to form a Composition (3).

This Composition (3) was applied to the surface of an iron plate to form a coating film of 30 microns in thickness. The coating film was cured by 10 MR of electron beam, and the thus cured film is referred to as "Sample (3)-A".

Further, several tests and measurements were carried out with regard to the above-mentioned Compositions and Samples, the results of which will be shown in the following.

| Viscosity: | Composition (1) | 400 cp |
|---|---|---|
| | Composition (2) | 1,800 cp |
| | Composition (3) | 2,200 cp |

Properties of Cured Films

| Samples | Water Resistance | Acid Resistance | Impact Resistance |
|---|---|---|---|
| (1)-A | ◎ | ◎ | 1 kg, ¼ inch 35 cm |
| (1)-B | ◎ | ◎ | 40 cm |
| (2)-A | ◎ | ◎ | > 50 cm |
| (3)-A | ◎ | ◎ | > 50 cm |
| Test Method | 40°C, 20 days | Electrolytic solution of electric battery, Spot, 24 hrs. | Du Pont Impact tester |

Note:
◎ : Excellent
○ : Good

According to the above-disclosed detailed explanation and examples, it will be understood that the liquid unsaturated resin composition of the present invention is very useful and the properties of the obtained coating film are excellent. It should be emphasized, however, that the examples described herein are intended as merely illustrative and in no way restrictive of the invention.

What is claimed is:

1. A liquid unsaturated resin composition which comprises (A) 60 to 95% by weight of liquid resin and (B) 5 to 40% by weight of polyvinyl monomer having high boiling point, wherein said liquid resin is produced by adding 1.5 to 2 molecules of a compound having both epoxy group and polymerizable unsaturated group to each molecule of a linear polyester of 500 to 5000 in number average molecular weight and having terminal carboxyl groups, and said linear polyester is produced by condensation of (a) 10 to 25% by weight of aromatic dibasic acid or its acid anhydride and (b) 75 to 90% by weight of aliphatic saturated compounds which consist of saturated aliphatic dibasic acid and saturated aliphatic glycol, and further 10 to 60% by weight of said aliphatic saturated compounds are alicyclic saturated dibasic acid or its acid anhydride, and wherein said polyvinyl monomer is at least one member selected from the group consisting of trimethylolpropane triacrylate, trimethylolethane trimethacrylate, ethylene glycol diacrylate, ethylene glycol dimethacrylate, 1,3-butylene glycol diacrylate, 1,3-butylene glycol dimethacrylate, 1,6-hexanediol diacrylate and 1,6-hexanediol dimethyacrylate.

2. A liquid unsaturated resin composition as claimed in claim 1, in which said aromatic dibasic acid or its acid anhydride is at least one member selected from the group consisting of phthalic acid, phthalic anhydride, terephthalic acid and isophthalic acid; said saturated aliphatic dibasic acid is at least one member selected from the group consisting of succinic acid, succinic anhydride, adipic acid and sebacic acid; said saturated aliphatic glycol is at least one member selected from the group consisting of ethylene glycol, pentyl glycol, isopenthyl glycol, neopentyl glycol, 1,3-butylene glycol and 1,6-hexanediol; and said alicyclic saturated dibasic acid is at least one member selected from the group consisting of hexahydrophthalic anhydride and esterified compounds of one molecule of cyclodecanediol with 2 molecules of succinic anhydride or hexahydrophthalic anhydride.

3. A liquid unsaturated resin composition as claimed in claim 1, in which said compound having epoxy group and polymerizable unsaturated group is at least one member selected from the group consisting of glycidyl methacrylate, glycidyl acrylate and glycidyl allyl ether.

4. A liquid unsaturated resin composition as claimed in claim 1, in which said polyester has a number average molecular weight of 1000 to 3000.

5. A liquid unsaturated resin composition as claimed in claim 1, further comprising 1–5% by weight of a crosslinking catalyst.

6. A liquid unsaturated resin composition as claimed in claim 1, further comprising 1–4% by weight of a photo-polymerization initiator.

7. A liquid unsaturated resin composition as claimed in claim 1, in which said polyester is of ingredients comprising hexahydrophthalic anhydride, adipic acid, phthalic anhydride, neopentyl glycol and 1,3-butylene glycol, said compound having both epoxy group and polymerizable unsaturated group is glycidyl acrylate and in which said polyvinyl monomer is 1,6-hexanediol diacrylate.

8. A liquid unsaturated resin composition as claimed in claim 1, in which said polyester is of ingredients comprising hexahydrophthalic anhydride, isophthalic acid and 1,6-hexanediol, said compound having both epoxy group and polymerizable unsaturated group is glycidyl methacrylate, and in which said polyvinyl monomer is 1,3-butylene glycol dimethacrylate.

9. A liquid unsaturated resin composition as claimed in claim 1, in which said polyester is of ingredients comprising cyclodecanediol disuccinic ester, phthalic anhydride, sebacic acid, ethylene glycol and 1,6-hexanediol, said compound having both epoxy group and polymerizable unsaturated group is glycidyl methacrylate, and in which said polyvinyl monomer is trimethylolpropane triacrylate.

* * * * *